Sept. 5, 1933. E. W. MIKAELSON 1,925,965
FLYING SHEAR
Filed April 17, 1931 4 Sheets-Sheet 3
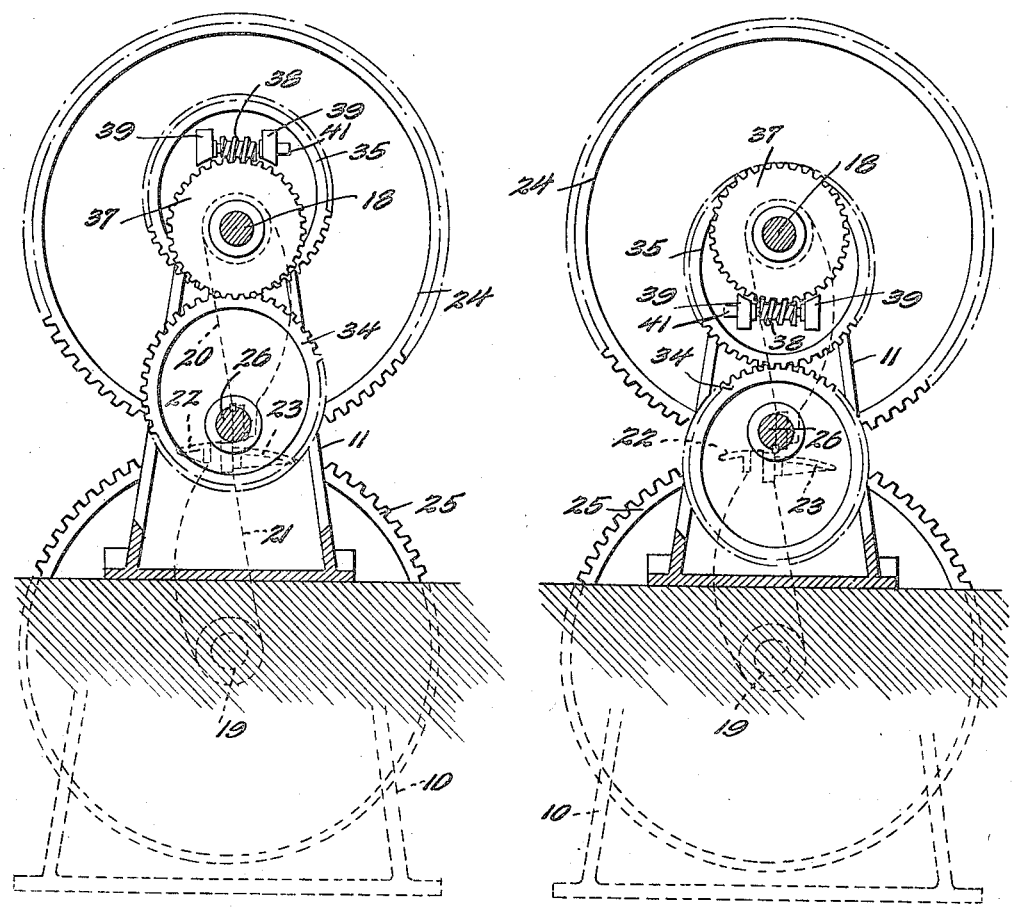

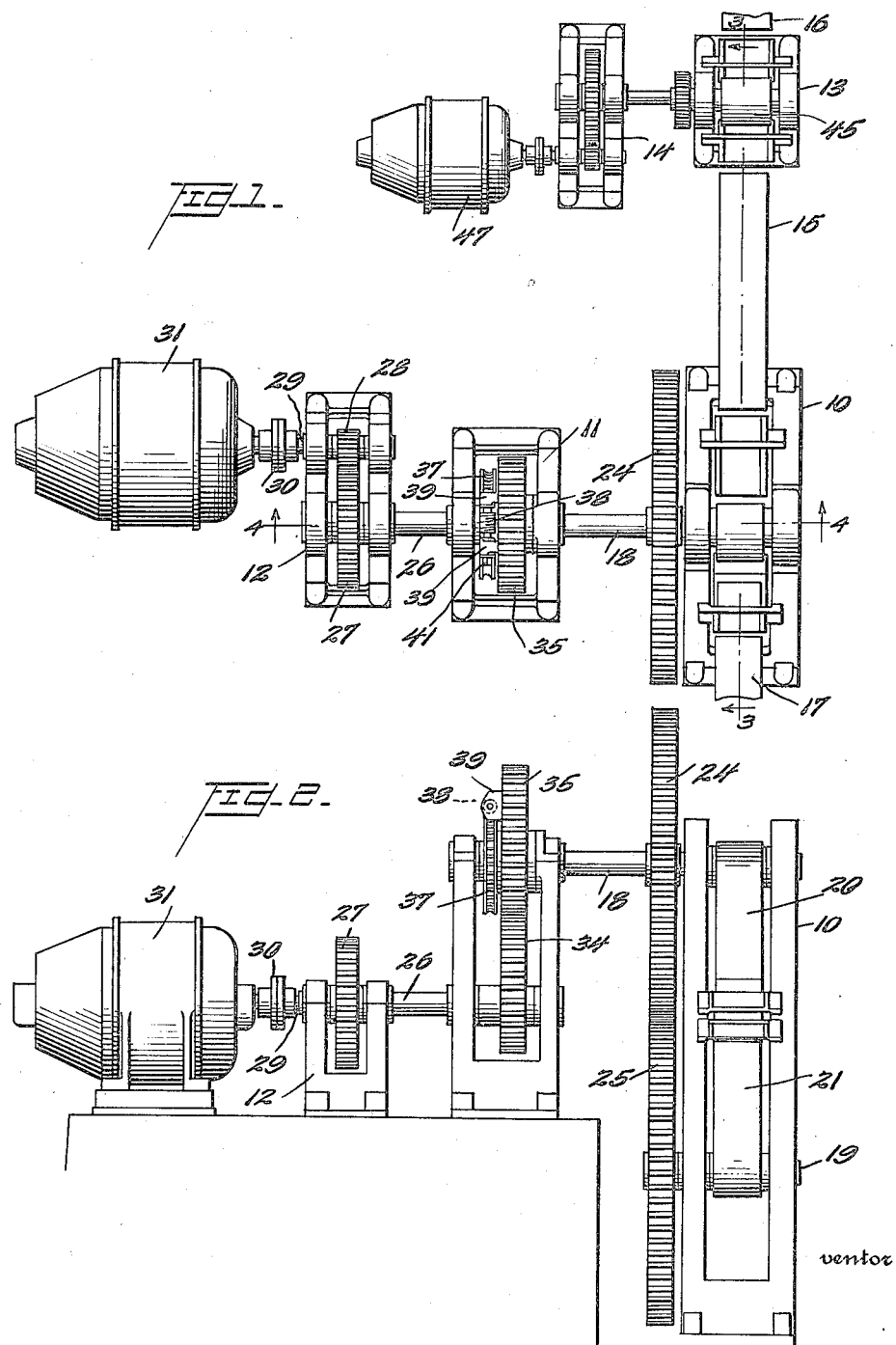

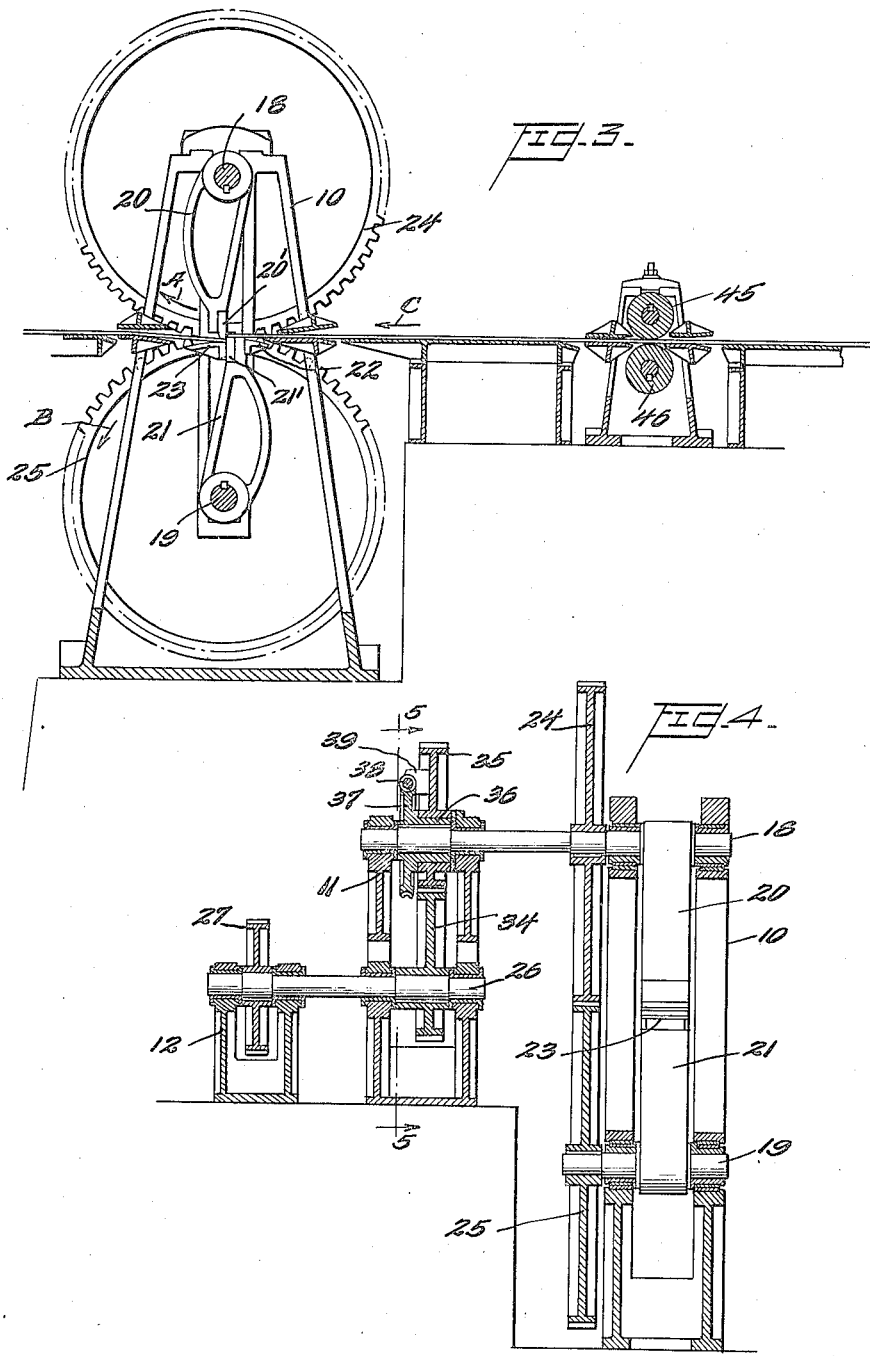

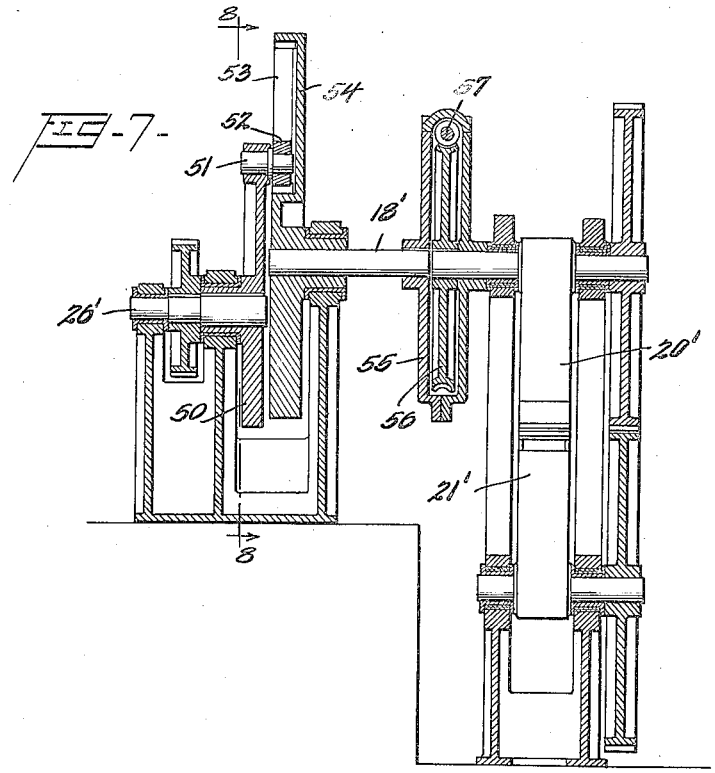
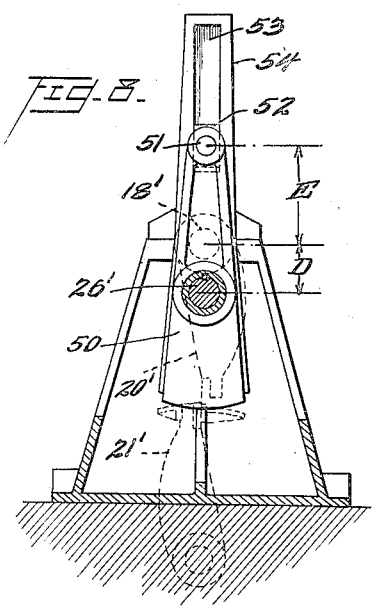
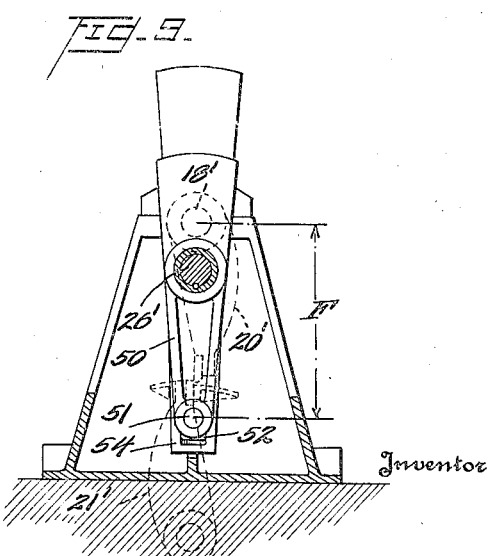

Patented Sept. 5, 1933

1,925,965

UNITED STATES PATENT OFFICE 1,925,965

FLYING SHEAR

Erik W. Mikaelson, Easton, Pa., assignor to Treadwell Engineering Company, Easton, Pa., a corporation of Pennsylvania Application April 17, 1931. Serial No. 530,989

8 Claims. (Cl. 164—66)

This invention relates to mechanism for shearing into suitable lengths, objects such as rolled metal bars, rods, strips, and sheets, and relates particularly to mechanism for shearing such objects into lengths while they are in motion, that is, while passing into the shearing apparatus at a substantially constant speed and without interruption.

Shearing mechanisms of this general type have been heretofore designed or suggested, being known in the art as "flying" shears, and have in actual practice proven their usefulness, especially when employed to shear metal members of small cross-section, such as bars, into suitable lengths.

It is highly desirable, if not absolutely essential, that such an apparatus be so designed that the shearing knives travel, during the shearing or cutting operation, at the same or substantially the same linear speed as the blank being operated on in order to avoid tearing of the metal and injury to the machine. It is also highly desirable in a mechanism of this character that means be provided whereby units of different lengths, as desired, may be cut from the elongated blank fed into the machine.

In accordance with the present invention, a flying shear is provided by means of which blanks of various kinds may be sheared into lengths cleanly and economically and which mechanism also may be readily adjusted so that the lengths of the severed units may be varied at will, within certain limits.

Preferably the shear and blank feeding means are driven from separate power sources, such as electric motors, the speeds of which may be individually regulated. The electrical circuits through these motors should be so interconnected that a fluctuation in current supply causing variation of speed of one of the motors will likewise cause a corresponding variation in speed of the other motor. The shear itself is so designed and constructed that the linear speed of its shearing blades, when in shearing position, may also be altered by adjustment, within certain limits, without varying the speed of the motor (or line shaft) which drives it. For given speeds of the shear driving and blank feeding motors, therefore, and a definite adjustment of the shear, the blanks will be cut into units of definite length, the shearing members traveling during the shearing operation at substantially the speed of the moving blank, as is desirable. To cut units of greater length from the blank, either the speed at which the blank is fed may be increased and a corresponding adjustment made in the shear, the speed of the shear driving motor remaining the same, or the speed of the shear driving motor may be decreased and the shear adjusted so as to give the same linear speed of the cutting members as before, while the speed of the blank feeding motor remains unaltered. Or the speeds of both the shear driving and blank feeding motors may be altered and the shear given a corresponding adjustment. In other words, the mechanism as a whole possesses great flexibility insofar as its capacity to properly and efficiently cut units of different lengths from a blank is concerned.

In its preferred embodiment the invention contemplates two cooperating revoluble shearing members which are so mounted and driven as to be in constant phase at all times during their motions of revolution, the blank entering the machine passing midway between the axes about which the shearing members revolve, and the shearing members simultaneously approaching and engaging the opposite sides of the blank to effect the shearing operation. The shaft (motor or line shaft) from which power is taken to operate the shearing members may revolve at a selected speed and the blank fed to the shear at a certain definite velocity. The driving connection between the power shaft and the shearing members is so designed and constructed that the shearing members may be caused to move faster or slower, as desired, while in actual contact with the blank, but without increasing the actual total number of revolutions of these members per unit of time. In other words, means is provided whereby the shearing members may be caused to travel rapidly through certain portions of their arcs of revolution and more slowly through other portions of their paths of revolution, this means being adjustable so that the particular linear speed (within certain limits) of the cutting members, while in contact with the work, may be varied as desired.

The invention is susceptible of a very considerable modification in adapting the same to the shearing of articles of different types and, in its broader aspects, is not strictly limited to shearing mechanism, the principles of the invention being susceptible of incorporation into machines of various types and designed to perform different, though analogous, mechanical operations.

Two forms of the invention, set forth by way of example, are illustrated in the accompanying drawings, in which:

Figure 1 is a top plan view of the shearing apparatus;

Figure 2 is a side elevation of the same;

Figure 3 is a section on line 3—3 of Fig. 1;

Figure 4 is a section on line 4—4 of Fig. 1;

Figure 5 is a section on line 5—5 of Fig. 4;

Figure 6 is a similar sectional view showing certain of the operating parts in different positions of adjustment;

Figure 7 is a section similar to Fig. 4 through a modified form of the apparatus shown in Figs.

1 to 6, a different mechanism for producing variable circular motion being employed;

Figure 8 is a section on line 8—8 of Fig. 7; and

Figure 9 is a similar section but showing certain parts in different positions.

The mechanism comprises essentially several groups of elements, separately mounted. Thus, a frame in which the two shearing elements are revolubly mounted is indicated at 10, a frame for supporting a portion of the novel driving mechanism at 11, a supporting frame for a reduction gearing at 12, a frame for supporting the pinch rolls for feeding the material at 13, and a second frame for a reduction gearing at 14. The details of these frames may be varied widely to suit operating conditions and in adapting the machine to any particular plant or mill. They will therefore not be described in great detail. Intermediate the shear frame 10 and the pinch roll frame 13 is a table 15 for supporting the work being fed to the shear. On the opposite side of the pinch rolls is a table 16 for supporting the material being passed through the rolls, and on the delivery side of the shear is a third table 17 upon which the severed units are delivered. The details of these work supporting tables may likewise be varied to suit operating conditions.

Referring now more particularly to Figures 3 and 4, it will be seen that the frame 10 comprises two spaced uprights or pedestals. Revolubly mounted in shitable bearings at the upper end of this frame is a horizontally disposed shaft 18, and toward the bottom of the frame is similarly mounted a parallel shaft 19. To these shafts are keyed the shearing members, which are indicated at 20 and 21, respectively. These elements may be formed in various ways but may conveniently have the shape shown in the drawings, each comprising essentially an arm extending radially from the shaft upon which it is mounted, the arms being preferably equal in length and each being provided with a cutting or shearing blade at its outer end, these blades being indicated at 20' and 21'. The lowermost arm 21 is also provided with work supporting portions 22 and 23, respectively, the former being provided as a support for the blank during and immediately after the shearing operation, and the latter being offset slightly downwardly from the effective cutting edge of blade 21' and being intended to support the end of the unit just severed, after the completion of the shearing operation.

The shearing members 20 and 21 are in Figure 3 shown in the positions which they respectively occupy immediately upon the termination of the shearing operation. It will be understood that the shafts 18 and 19 are revolved in opposite directions, as shown by the arrows A and B in Figure 3, and that the work is moved into the shear in the direction of the arrow C. The shearing members 20 and 21 are, during the operation of the mechanism, continuously revolved in opposite directions, and it is only when they are very nearly in alignment, as shown in Figure 3, that they are operative. They are at all times in phase with each other, however, the shafts 18 and 19 being constrained to move at the same angular velocities and to maintain proper phase relationship with each other by means of intermeshing gears 24 and 25, gear 24 being keyed on shaft 18 and gear 25 being keyed on shaft 19. The gears 24 and 25 likewise constitute the means for transmitting motion from the driving mechanism to shaft 19 inasmuch as shaft 18 alone is driven.

As shown in Figure 4, Shaft 18 is prolonged without the frame 10 and passes through aligned bearings in the upper portions of the parallel upright pedestals of frame 11. Frame 11 likewise carries a parallel shaft 26, one end of which is extended to pass through alinged bearings in the pedestals of frame 12. Keyed upon shaft 26 between the pedestals of frame 12 is a relatively large gear 27, the teeth of which mesh with those of a pinion 28 fixed on a short shaft 29 likewise revolubly supported in frame 12, the end of which shaft is connected by a suitable coupling 30 with an electric motor 31 which constitutes the power source for the operation of the shear. Pinion 28 being of relatively small diameter as compared with gear 27, it will be apparent that a suitable reduction of driving speed is effected at this point.

Keyed upon shaft 26 and positioned between the pedestals of frame 11 is an elliptical gear 34. The teeth of this gear mesh with those of a second elliptical gear 35 which is rotatably mounted upon a hub 36 keyed to shaft 18. Hub 36 has an integral, laterally extending, flanged portion 37 which comprises a worm wheel, the teeth of which mesh with those of a worm 38, which worm is supported for rotation by two bracket members 39 which project laterally in parallel relationship from one side of the elliptical gear 35. The core of worm 38 projects at one end through one of the supporting brackets 39 and is provided with squared end 41 which may be engaged by a suitable tool to effect rotation of the worm and hence relative movement of elliptical gear 35 and shaft 18. In effecting this relative movement or adjustment by means of worm 38, the worm wheel 37 will naturally be rotated also, and this rotation is opposed by friction in the shafts and motor but nevertheless can be easily effected while the mechanism is not in operation. An indicator may be provided to facilitate proper adjustment.

The pinch roll frame and the pinch rolls 45 and 46 supported therein may be of conventional form. The rolls are driven by a second electric motor 47 through a reduction gearing mounted on frame 14, the motor 47 being preferably of a type the speed of which can be adjusted as desired to effect different speeds of rotation of the pinch rolls 45 and 46 and different linear speeds of the work passing into the shear in the direction of the arrow C.

As the shear is driven by the driving connection which includes the elliptical gears 34 and 35, it is apparent that the shearing members may be so located that while they are in shearing position they will be driven at various speeds even though the power shaft is rotated at uniform angular velocity. As has been before explained, the positions of the gears relatively to the shearing members may be varied by manipulating worm 38, and in Figure 6 the gears are shown to be adjusted in such manner that the shearing members travel, when actually engaged in a shearing operation, at the minimum speed possible with the arrangement of gearing actually shown. Thus, it will be seen that the distance between the axis of driving shaft 26 and the pitch lines of the intermeshing teeth of the elliptical gears is much shorter than the distance between this same point and shaft 18. With the gears in the positions in which they are shown in this figure, therefore, they are serving as speed reducing gears, the shaft 18 being revolved at considerably less angular velocity than shaft 26. As a result, the shearing members are caused to travel very slowly, relatively speaking, as they perform the shearing operation.

As shown in Figure 5, on the other hand, each of the elliptical gears has been adjusted 180° relatively to the shearing members. The distance between the pitch line of the intermeshing teeth of these gears and shaft 26 is now very much greater than the distance between this same point and shaft 18. As a result of this arrangement, the elliptical gears are temporarily serving, while the shearing members are in shearing position, as speed increasing gears so that the cutting blades are at this time being advanced with the greatest linear speed possible with the arrangement of gearing shown. The gears may be adjusted to positions intermediate the positions in which they are shown in Figures 5 and 6, respectively, to vary the linear speeds of the shearing members in their shearing operations, but, inasmuch as the gears are always in mesh, the phase relationship between the shearing members is never lost. It will also be observed that, despite the adjustability of the device, the driving connection between the power source and the shearing members is never broken.

The mode of operation of the mechanism disclosed may be briefly described. For shearing members of minimum length, for a selected speed of the driving motor, the gears are adjusted to positions corresponding to those in which they are shown in Figure 6, and the blank is fed to the shear by the pinch rolls at such speed that its linear velocity is substantially that of the linear velocity of the cutting edges of the shearing members. To divide the oncoming blank into units of maximum length, still maintaining the speed of the prime mover the same as before, the elliptical gears are adjusted so that they occupy the positions indicated in Figure 5, and the speed of the pinch rolls is increased so that the blank is then fed to the shears at a higher speed, its linear speed being again approximately the same as the linear speed of the cutting edges of the shearing members when they are passing through shearing position. As a result, much longer lengths are cut than before, the absolute speed of the shearing members remaining the same while the speed of the work through the machine has been greatly increased. Lengths intermediate the minimum and maximum may be easily cut by adjusting the elliptical gears to intermediate positions and again modifying the speed of the pinch rolls.

Alternatively, the speed of the blank feeding rolls may be maintained constant and the speed of the shear driving motor increased or decreased, the elliptical gears being given the proper adjustment. In adapting the invention to shearing mechanisms of different types, the design and arrangement of the component elements of the invention may be considerably changed to suit operating conditions, and, in general, the invention may be embodied in mechanisms which differ widely in details and appearance without departure from the spirit and scope thereof.

Thus in Figures 7, 8 and 9 is illustrated a form of mechanism for imparting variable circular motion to the shearing arms, in which the elliptical gears are replaced by a different organization of driving elements. Here the shafts 18' and 26' are arranged in parallelism and with their axes spaced apart by the distance indicated at D. Fixed on the driving shaft 26' is a crank 50 having at one end a crank pin 51 carrying a rectangular slide block 52. Block 52 lies in a slot 53 in a crank 54 fixed on shaft 18' and slides back and forth in this slot as shafts 26' and 18' revolve. By the operation of these two interconnected cranks the uniform rotary movement of shaft 26' is translated into non-uniform motion of shaft 18' in much the same manner as in the case of the form of the invention first described, in which elliptical gears are employed to achieve this result.

Shaft 18' is interrupted at a point intermediate the crank 54 and the stand which houses the shearing blades, as is apparent from Figure 7. A housing 55 for a worm gear 56 is fixed on the left hand section of shaft 18' (Figure 7) and the worm gear which it encloses is fixed on the right hand section. A worm 57 has its ends rotatably mounted in housing 55 and meshes with the teeth of worm 56. By rotating worm 57, therefore, the angular relationship of the two sections of shaft 18' may be changed as desired, and hence the relative angular positions of the shearing arms 20' and 21' and driving shaft 26' may be changed as desired. Thus in Figure 8 of the drawings the cranks are shown to be vertically extended upwardly when the shearing arms are in shearing position, and in Figure 9 they are shown as extending downwardly when the shearing arms are in shearing position.

With the adjustment shown in Figure 8 the shearing knives will be constrained to move at the maximum velocity possible for a given speed of the driving motor, the effective radius of crank 50 then being relatively short, i. e. the distance indicated by the line E. With the adjustment shown in Figure 9, the shearing blades will move, in cutting, at the minimum velocity possible, the effective radius of crank 50 then being relatively long, i. e. the distance indicated by the line F. Of course an intermediate adjustment will bring about some intermediate speed of cutting of the blades, it being possible to choose any desired speed in the range between maximum and minimum by simply operating the adjusting worm 57.

The means for feeding the blank etc., is preferably the same for the mechanism shown in Figures 7, 8 and 9 as in the case of the shear driving mechanism shown in Figures 1 to 6, inclusive, and need not be specifically described.

Having thus described the invention, what is claimed as new and desired to be secured by Letters Patent is:—

1. In a shearing mechanism, in combination, a shearing member revoluble about a fixed axis, a power shaft, and means operatively connecting said member and shaft including two cranks respectively mounted for continuous complete rotary motion about parallel but offset axes, a pin permanently fixed to one of said cranks and the other crank being provided with a slot in which the pin slidably fits, and means spaced from said cranks and disposed intermediate the cranks and shearing member whereby the relative angular positions of crank and shearing member may be adjusted.

2. The combination set forth in claim 1 in which said last mentioned means comprises a worm and worm wheel, the force transmitted to the shearing member being transmitted through the worm.

3. In a shearing mechanism, in combination, a shearing member revoluble about a fixed axis, a power shaft adapted to be continuously rotated at a constant angular velocity, a driven shaft whose axis is parallel to but offset with respect to that of the power shaft, means operatively connecting said shafts whereby said driven shaft is rotated at a speed which varies from a maximum to a minimum within a single complete revolution, and other means disposed between said driven shaft and said shearing member for adjusting the relative angular positions of said shaft and member so that the speed of said member at the moment of making a cut may be regulated between said maximum and minimum limits.

4. In a shearing mechanism, in combination, a shearing member revoluble about a fixed axis, a power shaft adapted to be continuously rotated at a constant angular velocity, a driven shaft whose axis is parallel to but offset with respect to that of the power shaft, means operatively connecting said shafts whereby said driven shaft is rotated at a speed which varies from a maximum to a minimum within a single complete revolution, and other means disposed between said driven shaft and said shearing member for adjusting the relative angular positions of said shaft and member so that the speed of said member at the moment of making a cut may be regulated between said maximum and minimum limits, the transmission of the driving force to said shearing member being effected through said power shaft, said first named means, said driven shaft, and said second named means in the order named.

5. In a shearing mechanism, in combination, a shearing member revoluble about a fixed axis, a power shaft adapted to be continously rotated at a constant angular velocity, a driven shaft whose axis is parallel to but offset with respect to that of the power shaft, a crank rigidly mounted on said piwer shaft, a crank rigidly mounted on said driven shaft, a pin permanently fixed to one of said cranks, the other crank having a slot in which said pin is adapted to slide, whereby said driven shaft is rotated at a speed which varies from a maximum to a minimum within a single complete revolution, and means disposed between said driven shaft and said shearing member for adjusting the relative angular positions of said shaft and member so that the speed of said member at the moment of making a cut may be regulated between said maximum and minimum limits.

6. In a shearing mechanism, in combination, a shearing member revoluble about a fixed axis, a power shaft adapted to be continuously rotated at a constant angular velocity, a driven shaft whose axis is parallel to but offset with respect to that of the power shaft, whereby said driven shaft is rotated at a speed which varies from a maximum to a minimum within a single complete revolution, and means comprising a worm and a worm wheel disposed between said driven shaft and said shearing member for adjusting the relative angular positions of said shaft and member so that the speed of said member at the moment of making a cut may be regulated between said maximum and minimum limits.

7. In a shearing mechanism, in combination, a pair of rotary knives operatively associated for rotation in opposite directions about fixed axes and for intermittent cooperation in the shearing of material passing between them, a driven shaft operatively connected with said knives for rotating them, a driving shaft connected with a source of power and adapted to rotate with a constant angular velocity, means for operatively connecting the driving and driven shafts whereby the velocity of said driven shaft varies during a single rotation between certain maximum and minimum limits, while the average angular velocity during a single rotation is equal to the constant velocity of said driven shaft, said driven shaft being divided, a worm wheel mounted on one section thereof, a worm carrier mounted on the other section thereof, and a worm on said carrier adapted to mesh with said wheel, whereby the relative angular position of the two sections of said driven shaft may be adjusted in order to regulate the speed of said shear knives during their shearing action between said maximum and minimum limits.

8. In a shearing mechanism, in combination, a pair of rotary knives operatively associated for rotation in opposite directions about fixed axes and for intermittent cooperation in the shearing of material passing between them, a driven shaft operatively connected with said knives for rotating them, a driving shaft connected with a source of power and adapted to rotate with a constant angular velocity, means for operatively connecting the driving and driven shafts whereby the velocity of said driven shaft varies during a single rotation between certain maximum and minimum limits, while the average angular velocity during a single rotation is equal to the constant velocity of said driven shaft, said means comprising two cranks connected respectively to said driving and driven shafts and mounted to rotate about parallel but offset axes, one crank having a pin carried thereby and the other having a slot in which said pin is adapted to move, said driven shaft being divided, a worm wheel mounted on one section thereof, a worm carrier mounted on the other section thereof, and a worm on said carrier adapted to mesh with said wheel, whereby the relative angular position of the two sections of said driven shaft may be adjusted in order to regulate the speed of said shear knives during their shearing action between said maximum and minimum limits.

ERIK W. MIKAELSON.